Patented Jan. 30, 1951

2,540,050

UNITED STATES PATENT OFFICE 2,540,050

ENZYMATIC METHOD OF MAKING PECTIC PREPARATION

Herbert T. Leo and Clarence C. Taylor, Anaheim, Calif.

No Drawing. Application November 20, 1946, Serial No. 711,195

14 Claims. (Cl. 195—30)

This invention relates generally to the enzymatic treatment of pectin for preparing novel pectic substances, inter alia, those disclosed in our co-pending application Serial No. 616,654, filed September 15, 1945, now abandoned, entitled "Novel Type of Pectic Substance and Method of Preparing the Same," and therein designated with the term "pectinylic acids."

More particularly, this invention relates to the treatment of pectin with the enzyme pectase.

By the term "pectase" we mean an enzymatic material derived from a suitable vegetable source and capable of acting on soluble pectin to convert the same into a more or less incompletely demethoxylated product, herein referred to as pectinic acids. Whether or not pectase includes only a single enzyme or a group of enzymes is not definitely known. For this reason, the term "pectase" is used in this application to cover both any single enzyme and any mixtures of enzymes capable of acting on soluble pectin with the above-mentioned results. We do not include within the scope of this term other pectic enzymes such as "pectinase" which is said to effect a complete decomposition of the pectin molecule into its various single component parts.

The starting material in the process disclosed in our said co-pending application is an aqueous dispersion of pectin, preferably a pectin extract of fruit or other vegetable material obtained by the action of an acid aqueous medium on said fruit or other vegetable material followed by a separation of residual fruit pulp from the extract, as by filtration with the use of a filter aid (diatomaceous earth). Most suitably, the filtered extract is concentrated by evaporation, say, to about one-half or one-quarter of its original volume. According to the method disclosed in our said co-pending application, we incorporate with such an aqueous pectin dispersion or extract calcium carbonate or the like in an amount sufficient to maintain the pH value in said dispersion or extract at at least 5.3. We also incorporate with the pectin dispersion or extract a suitable amount of pectase and maintain the resulting mixture at a suitable temperature (below 160° F.) while pectase action is allowed to progress. The action of the pectase on the pectin causes the precipitation of a calcium-pectinic acid jelly soon after pectase action has been initiated, and this jelly grows increasingly firm. When pectase action has progressed to any desired point, the pectase action is terminated, preferably by washing the calcium-pectinylic acid jelly (which contains almost all of the water of the treated pectin dispersion or extract) with acidified aqueous alcohol. This washing also serves to dehydrate the jelly to a considerable extent and to remove a major portion, if not all, of the calcium present in said jelly, to yield a product that after drying and grinding represents the final product.

It will be noted that the process disclosed in our said copending application involves initially providing an aqueous dispersion of pectin and causing pectase to act on said aqueous dispersion with resultant precipitation of a calcium-pectinic acid jelly which is subsequently washed with acidified aqueous alcohol.

We have now found that we can cause a pectase dispersion to act on pectin in solid form to produce the above-mentioned pectinylic acids and other desirable pectin materials. More particularly, we have found that an eminently suitable starting material for the modification of pectin by means of pectase is to be found in a coprecipitate of aluminum hydroxide and pectin. Such a coprecipitate of aluminum hydroxide and pectin may be prepared by precipitating aluminum hydroxide in a pectin dispersion or a pectin extract, for instance, in the manner disclosed in our copending application Serial No. 687,956, filed August 2, 1946, now U. S. Patent No. 2,425,947, issued August 19, 1947, entitled "Method of Preparing Pectin." By such pectase treatment of solid pectin, in particular, a coprecipitate of aluminum hydroxide and pectin, we can prepare the very same products as those obtained by the method disclosed in our copending application Serial No. 616,654. As described in the aforementioned Patent No. 2,425,947, pectin and aluminum hydroxide may be coprecipitated by treating a dilute aqueous solution of pectin with calcium carbonate to effect a pH of from 6.00 to 6.80 after the removal of liberated carbon dioxide, and adding to the extract an aqueous solution of a water soluble aluminum compound, such as aluminum chloride, to effect a pH of 3.70 to 4.50 in the mixture. The resulting gelatinous pectin-aluminum hydroxide coprecipitate may then be filtered, washed with acidified alcohol, and dried.

When solid pectin is treated with pectase according to our present invention, the pectin remains in solid form. No jelly is formed, and all the difficulties inherent in handling a jelly are avoided. Further, the treatment of solid pectin with pectase makes possible considerable economies. Thus, it is possible to treat an aluminum hydroxide-pectin coprecipitate containing very little water, as compared with the pectin dispersion or extract in which such a coprecipitate is formed. It should be remembered that practically all pectin is obtained by a process including an initial extraction of fruit or vegetable material and that coprecipitation with aluminum hydroxide probably represents the cheapest method of concentrating the pectin content of the resulting extract. By treating a coprecipitate of aluminum hydroxide and pectin with pectase, we avoid the necessity for removing water either by concentrating a pectin extract or by alcohol washing of the jelly obtained by a pectase treatment either of the original extract or a concentrate thereof.

It should further be noted that treatment of solid pectin, in particular, of a coprecipitate of pectin and aluminum hydroxide, involves the treatment of pectin in more concentrated form than the treatment of an aqueous pectin dispersion or extract or concentrate thereof. Hence, treatment of solid pectin with pectase according to the present invention can be carried out in tanks or other equipment of much smaller volumetric capacity than the apparatus required for treatment with pectase of pectin dispersions. Finally, it should be noted that treatment with pectase of pectin according to the present invention involves a minimum of departure from standard methods of producing pectin involving, in sequence, the steps of extracting pectin from vegetable or fruit material, filtering the resulting extract, coprecipitating aluminum hydroxide and pectin from the filtered extract, washing out aluminum from the coprecipitate with acidified aqueous alcohol, drying and grinding. To prepare modified pectic substances according to the present invention, it is only necessary to insert a pectase treatment following the coprecipitation of aluminum hydroxide and pectin and immediately before the washing with acidified aqueous alcohol. No apparatus of special design is required, as when handling the jellies obtained when proceeding according to the methods of our application Serial No. 616,654.

It is therefore an important object of the present invention to provide an improved and relatively inexpensive method of treating pectin with pectase comprising the step of causing said pectase to act on solid pectin, preferably a coprecipitate of pectin and aluminum hydroxide that is wetted with water or that contains absorbed water.

Other and further objects and features of the present invention will become apparent from the following description and appended claims.

In proceeding according to the present invention, we use as a preferred starting material a coprecipitate of aluminum hydroxide and pectin such as may be prepared from a pectin extract of fruit or vegetable material by methods well known in the art. The coprecipitate may be formed by the method disclosed in our application Serial No. 687,956. As described in the previously mentioned application Serial No. 687,956, pectin and aluminum hydroxide may be coprecipitated by treating a dilute aqueous solution of pectin with calcium carbonate to effect a pH from 6.00 to 6.80 after the removal of liberated carbon dioxide, and adding to the extract an aqueous solution of a water soluble aluminum compound, such as aluminum chloride, to effect a pH from 3.70 to 4.50 in the mixture. The resulting gelatinous pectin-aluminum hydroxide coprecipitate may then be filtered, washed with acidified alcohol, and dried. We prefer to filter off this coprecipitate from the extract in which it was formed and to compress the coprecipitate, as by means of a screw press such as the Leo press or by means of a filter press. The press cakes thus obtained are preferably shredded or disintegrated and screened, for instance, through a four- or eight-mesh screen. The resulting granular product contains absorbed water, but feels relatively dry to the touch and is capable of absorbing relatively large additional amounts of water while retaining its granular form. One pound of the screened, shredded aluminum hydroxide-pectin coprecipitate fills almost exactly a quart container (after tamping). To one pound of the pressed, shredded, sifted coprecipitate we can add 500 cc. of water without increasing the volume of said one pound of coprecipitate and without the appearance of practically any free liquid.

Starting with such a relatively firm, shredded, sifted and absorbent coprecipitate of aluminum hydroxide and pectin, we may add to each pound thereof, for instance, a mixture of 250 c. c. of pectase solution, 250 c. c. of tap water, and 6 grams of chalk. The enzyme solution, water, and chalk are mixed together, and the resulting mixture is quickly stirred into the coprecipitate. It is important to mix the enzyme, water, and chalk before adding the resulting mixture to the coprecipitate, because the pressed-out coprecipitate will absorb the liquid quickly and the pectase action is quite rapid. If the pectase, water, and chalk were stirred into the coprecipitate separately, a homogeneous mixture may not be obtained at once, and the pectase action may not be uniform throughout the coprecipitate.

The above-disclosed amounts of enzyme solution, water, and chalk are given by way of example only. The exact amount of enzyme to be added depends upon the potency of the enzyme infusion or solution being incorporated and upon the desired rate of pectase action. The amount of water added is a function of the volume of pectase solution added, for, ordinarily, we prefer, in effect, to dilute the enzyme solution with the added water to the point where the resulting diluted pectase solution, while as dilute as possible, still will be completely absorbed by the coprecipitate. By the use of a pectase solution of maximum dilution we secure a more uniform pectase action. The amount of chalk or other added neutralizing agent (selected from the alkaline earth metal salts and the magnesium compounds) is that required to maintain a pH of at least 5.3 and preferably between 5.8 and 6.0 throughout the pectase action.

The pectase action is allowed to proceed at a suitable temperature below 160° F., for instance, between 100° and 120° F. As pectase action progresses, some liquid is squeezed out from the coprecipitate.

When pectase action has progressed to any desired point, the pectase action is terminated, preferably by adding to the reaction mixture enough alcohol (ethyl alcohol, isopropyl alcohol, or the like) to form a mixture containing about 40% alcohol. This addition of alcohol not only terminates the enzyme action but also dissolves out any material soluble in aqueous alcohol that might tend to interfere with subsequent extraction with acidified aqueous alcohol. The free aqueous alcohol is next drained off, as through a reel. To the drained-off solid material we add sufficient alcohol to form a mixture containing preferably between 50 and 60% alcohol. To the resultant mixture we add sufficient acidified aqueous alcohol of the same concentration to bring down the pH of the mixture to about 1.00. The preferred acid employed is hydrochloric acid. By adding the acid mixed with alcohol to the pectic material admixed with alcohol, we avoid any dissolution of pectic material with consequent formation of slimy matter and incomplete washing out of impurities, calcium and aluminum compounds and the like. Ordinarily 50 c. c. of concentrated hydrochloric acid is sufficient to establish a pH of 1.00 in a mixture containing one pound of coprecipitate. After the coprecipitate has been allowed to soak in the acidified aqueous alcohol for some time, the acidified aqueous alcohol is drained off. The washing with acidified aqueous alcohol is then repeated, using preferably for each pound of coprecipitate 8 fluid ounces of 80% alcohol and 10 c. c. of concentrated hydrochloric acid to maintain a pH of about 1.00. After a brief soaking this acidified aqueous alcohol is drained off, and the solid pectic material is thereafter washed repeatedly with high strength (about 80%) alcohol until a pH of from 2.3 to 2.5 is reached. At that time the pectic material is washed with high strength alcohol containing sufficient sodium lactate to raise the pH to 3.0 or higher. After this washing with alcohol containing sodium lactate, the pectic material is ready to be pressed, vacuum-dried, and pulverized to yield a water soluble product suitable for the preparation of jellies.

The progress of the pectase action may be followed by measuring, from time to time, the minimum pH required for dissolution of the calcium-pectinic acid combination present in the reacting mixture or by measuring the minimum pH required for formation of a calcium-pectinic acid jelly from the pectic material present in the reacting mixture. Methods for determining the minimum pH required for dissolution of the calcium combination and for determining the minimum pH required for formation of a calcium jelly are disclosed in our said co-pending application Serial No. 616,654, and also in our co-pending application Serial No. 631,487, filed November 28, 1945, entitled "Method of Testing Pectic Substances."

A preferred method for following the progress of the pectase action is described as follows. A 50% lactic acid solution having a pH of about 0.60 is prepared. We also prepare a 12½% solution of hydrochloric acid having a pH of about 0.10. The pH required for dissolution of a combination of calcium with pectase treated pectin is determined by using these two acid solutions. For this purpose, samples of the pectin-aluminum hydroxide coprecipitate being treated with pectase are taken from time to time during the pectase action (suitably at 5 to 10 minute intervals). More particularly, a 100 cc. beaker is packed with the wet coprecipitate. The coprecipitate thus measured out is transferred into a 250 cc. beaker. During the first stages of the pectase action, we add to the coprecipitate in the 250 cc. beaker, 30 cc. of the 50% lactic acid solution, to form a mixture having a pH of about 2.00. When this test is carried out before the pectase dispersion has been incorporated with the coprecipitate, the coprecipitate will dissolve quickly to form a smooth paste. When samples are taken throughout the first stages of the pectase action, it will be noted that the coprecipitate in successive samples will dissolve progressively more slowly until, at said pH of 2.00, the treated pectin simply swells and does not go into solution. This end point is very easily recognized, for the swollen but undissolved particles of treated pectin (which may be held together by water containing a minute quantity of dissolved pectin) present a characteristic appearance similar to tapioca paste. This end point has been chosen as suitable in the preparation of pectase treated pectin particularly adapted for making jellies containing more than 65% sugar.

If it is desired to prepare a more calcium susceptible pectase treated pectin, for instance, a pectase treated pectin suitable for the preparation of custard-like milk jellies, then the pectase treatment is carried past the above disclosed end point. Past this end point, we employ the above described 12½% hydrochloric acid solution. As when using the lactic acid, we continue to take samples at from 5 to 10 minute intervals, measure out the amount of coprecipitate disclosed hereinabove, and add 30 cc. of hydrochloric acid to form a mixture having a pH of 0.60. Pectase treatment is allowed to progress until, by the use of the hydrochloric acid solution to effect a pH of 0.60, we again reach an end point where the treated coprecipitate particles only swell but do not go into solution. The pectase treatment is then terminated by methods disclosed hereinabove.

The above described tests can be carried out within less than 3 minutes. There is a remarkable difference in appearance between the various acid-coprecipitate mixtures obtained from five samples taken within 30 minutes. The accuracy of our method of testing has been verified by isolating and characterizing the pectase treated pectin obtained when using our method of testing. For instance, in 10 separate successive treatments of pectin with pectase according to the presently described method, and terminating the pectase treatment of the first of the two above disclosed end points (employing lactic acid) we prepared ten pectinic acid batches characterized by setting times (in the preparation of 65% sugar jellies) that did not vary from each other by more than 2 minutes.

If it is desired to terminate the pectase action at other stages than those represented by the above disclosed two end points, then the same test can be carried out using different amounts of acids to effect other pH values, for the pH at which transition from dissolution to swelling of the treated coprecipitate occurs is a definite characteristic of each stage in the progressive pectase action. Thus, the tests may be carried out by preparing an acid-coprecipitate sample mixture having a pH value of, for instance, 1.50 or 1.00, to prepare pectase treated pectins characterized by definite and characteristic jellying properties, in particular, setting times and calcium susceptibilities.

The above indicated tests should be carried out with samples taken from a batch of pectin being treated at sufficiently frequent intervals and at a sufficient early stage to insure that the desired end point is not passed over.

In the preceding discussion, we have referred specifically to the action of pectase on a pressed-out aluminum hydroxide-pectin coprecipitate. It should be understood, however, that the methods of the present invention are applicable for effecting a pectase action of an aluminum hydroxide-pectin coprecipitate at any state of its handling, from the moment when it has been precipitated to the time when it has been removed from the filter press. Thus, after such a coprecipitate has been formed, it is quite feasible to drain off some or all of the liquid in which the coprecipitate was formed (if the coprecipitate tends to float on top of the liquid) or to drain off supernatant liquid (in the event the coprecipitate tends to settle to the bottom), and then incorporate chalk and pectase with the wet coprecipitate. Pectase action will then proceed as disclosed hereinabove, and when the pectase action has progressed to any desired point, the pectase action may be terminated as disclosed hereinabove and the pectic product obtained may be washed with an acidified aqueous alcohol as also disclosed hereinabove.

It should be further understood that pectase action may be terminated by other means than those disclosed, for instance, by heating to 160° F. or higher or by acidifying the reaction mixture, say, to a pH of 1.00 or less.

To illustrate more clearly the working of the present invention, specific examples of methods according to the present invention are disclosed hereinbelow.

To each of two 1 lb. samples of shredded and sifted pectin-aluminum hydroxide coprecipitate prepared from orange according to the methods of our said co-pending application Serial No. 687,956, we added 250 cc. of a solution of lemon pectase diluted with 250 cc. of tap water and having 6 grams of chalk dispersed therein. The temperature during pectase action was 98° F. The first sample was treated for 15 minutes, while the second sample was treated for 30 minutes. In the case of both samples, pectase action was terminated by addition of alcohol, and two rinsings with acidified aqueous alcohol were carried out at a pH of 1.0, the pectic product then being washed with neutral high-strength alcohol and finally with alcohol containing sodium lactate to raise the pH to 3.0, all as disclosed hereinabove.

We also washed a 1 lb. sample of the same pectin-aluminum hydroxide coprepicitate twice with acid alcohol (at 55% alcohol concentration and a pH of 1.0), finally washing with neutral high-strength alcohol and with an alcoholic sodium lactate solution.

Hereinafter, the sample treated with pectase for 15 minutes is identified as sample I; the sample treated with pectase for 30 minutes as sample II; and the untreated sample, as sample III.

The same yield of pectin was obtained in all three experiments, within the limits of experimental error.

65% sugar jellies were prepared from all three samples by a standard method. In each case, 500 grams sugar, 325 cc. distilled water, 2.25 grams of pectic material (assumed to be 225 grade) and 2 cc. of a 25% sodium citrate solution were boiled to 65% sugar content. The syrup thus prepared from each sample was divided between three jelly glasses containing, respectively, 2 cc., 3 cc., and 4 cc. of a 50% citric acid solution. The jelly glasses were allowed to stand, the time required for jelly formation was noted, and the jellies obtained were turned out from the jelly glasses for the purpose of checking the strength of the jelly and to determine the jelly grade of the pectin samples. The results obtained are tabulated as follows:

| No. I | 2 c. c. | 3 c. c. | 4 c. c. |
|---|---|---|---|
| Set In | 30 Minutes | 30 Minutes | 27 Minutes. |
| pH | 2.85 | 2.70 | 2.60. |
| Texture | Firm | Firm | Firm. |

| No. II | 2 c. c. | 3 c. c. | 4 c. c. |
|---|---|---|---|
| Set In | 30 Minutes | 30 Minutes | 27 Minutes. |
| pH | 2.78 | 2.70 | 2.60. |
| Texture | Firm | Firm | Firm. |

| No. III | 2 c. c. | 3 c. c. | 4 c. c. |
|---|---|---|---|
| Set In | 12 Minutes | 9 Minutes | 7 Minutes. |
| pH | 2.95 | 2.72 | 2.60. |
| Texture | Firm | Firm | Firm. |

We noted that samples I and II were much slower setting than sample number III and yielded jellies slightly firmer than the jelly obtained from number III. In other words, there was no loss in jelly grade. In this connection, it should be noted that when the setting time of a pectin is increased by conventional means, as by treatment in acid alcohol at a pH of 1.0 for two and one-half hours, the production of a pectin having a setting time of seven minutes involves a 10% loss in jelly strength, without rendering the pectin at all susceptible to precipitation by calcium.

We also prepared actual fruit jellies from said three samples by using standard commercial grape juice (Welch) and standard commercial cider (Martinelli). Standard grape juice has a pH of 3.40, which we lowered by the addition of 15 cc. of 50% citric acid solution to 1 liter of grape juice to form a jelly having a pH of 3.25. Standard commercial cider has a pH of 3.75, which we lowered by addition of 25 cc. of 50% citric acid solution to 1 liter of cider to produce an apple jelly having a pH of 3.20.

The grape juice jelly was prepared from 450 grams of sugar, 325 cc. of the grape juice containing added citric acid, 2.25 grams of 225 grade pectic material, and 2 cc. of a 25% sodium citrate solution.

The apple jelly was prepared from 475 grams sugar, 325 cc. cider containing added citric acid, 2.25 grams of 225 grade pectic material, and 2 cc. of 25% sodium citrate solution.

In each instance, the pectic material was dissolved in the juice containing the citric acid and the sodium citrate, then adding the sugar and finally boiling the resulting mixture to a 65% sugar content. The resulting syrup was then poured out into jelly glasses.

Samples I and II were characterized by a drastically reduced temperature of set, as compared to sample III. The syrup cooled in the jelly glasses before a jelly was formed, at least 27 minutes being required for jelly formation. The jellies obtained from samples I and II were much firmer than the jellies obtained from sample III.

The difference in calcium susceptibility between the three samples is indicated by the following data.

Of each sample, sufficient pectic material to be equivalent to 2 grams of 100 grade material were dissolved (by heating) in 100 c. c. of water containing 0.4 gram of sodium citrate. One tablespoon of vinegar was added to each solution, No jelly formed in any of the solutions on cooling.

The same test was repeated, 0.08 gram of calcium lactate being incorporated with the solutions of pectic material. In this case, the solutions obtained from samples I and III remained fluid, but the solution obtained from sample II formed a weak jelly.

The test was again repeated using twice the indicated amount of calcium lactate. The solution obtained from sample III remained fluid; the solution obtained from sample I formed a soft jelly; the solution obtained from sample II formed a firm jelly.

A custard-like milk jelly was prepared from sample II as follows: A mixture was made up of the pectic material of sample III, dextrose, and sodium citrate. The proportions of pectic material, dextrose, and sodium citrate were adjusted to yield a 100 grade material containing 20% sodium citrate and 4% calcium lactate. 3 ounces of 100 grade material so prepared were dissolved in 8 ounces tap water by boiling. The addition to the resulting solution of one cup milk or one 5⅓ fluid ounce can of condensed milk yielded an excellent custard-like milk jelly after cooling in a refrigerator.

Proceeding on a larger scale, pectin may be treated with pectase as follows. A pectase dispersion is first prepared from lemon or orange peel. For this purpose, lemon or orange peel is ground with a small amount of water. The mixture of water and peel thus obtained is bodily removed from the mill and sufficient calcium carbonate is added, along with some sodium chloride, to raise the pH to between 6.0 and 7.0. Within a very short time the pectase will coagulate all the pectic substances in solution. It is then quite easy to press or filter out a very potent pectase dispersion. To 100 gallons of such a dispersion prepared from lemon peel we add 15 lbs. of calcium carbonate to prepare a pectase dispersion-calcium carbonate mixture sufficient to treat 200 gallons of pectin-aluminum hydroxide coprecipitate press cake to form in from 1 to 2 hours a very calcium susceptible pectinic acid suitable for the preparation of custard-like milk jellies. When orange peel is employed, one part of the pectase dispersion obtained therefrom is diluted with 2 parts of water, and 15 lbs. of calcium carbonate are added to 100 gals. of the diluted pectase dispersion, to yield a pectase dispersion-calcium carbonate mixture likewise suitable for the treatment of 200 gals. of pectin-aluminum hydroxide coprecipitate press cake for the preparation within 1 to 2 hours of a very calcium susceptible pectinic acid suitable for the preparation of custard-like milk jellies.

It will thus be seen that we have provided a novel method of treating pectin with pectase in which the pectin is maintained throughout said treatment in solid state at the pH of at least 5.3 by incorporation therewith of a neutralizing composition selected from the group consisting of alkaline earth, metal salts and magnesium compounds. The preferred starting material is an aluminum hydroxide-pectin coprecipitate. Many details of procedure and composition may be varied within a wide range without departing from the principles of this invention, and it is therefore not our purpose to limit the patent granted on this invention otherwise than necessitated by the scope of the appended claims.

Reference is made to our said co-pending applications for features not disclosed or discussed in the present application.

We claim as our invention:

1. The method of enzymatically treating pectin which comprises providing a moist relatively firm pectin-aluminum hydroxide coprecipitate capable of absorbing an additional amount of water, incorporating with said coprecipitate a neutralizing agent selected from the group consisting of alkaline earth metal salts and magnesium compounds in an amount sufficient to maintain said coprecipitate at a pH of at least 5.3 throughout said enzyme treatment, incorporating an aqueous pectase dispersion with said coprecipitate in an amount only sufficient for absorption thereby, maintaining the resulting mixture at a temperature at which the pectin will be chemically modified by said pectase, terminating the action of the pectase on said pectin, and washing said coprecipitate with acidified aqueous alcohol to remove aluminum hydroxide and calcium compounds from the resulting solid pectic product.

2. The method of enzymatically treating pectin which comprises providing a solid pectin containing material, maintaining said material in a moist yet solid condition at a pH of at least 5.3 but not substantially over 6.0 by incorporating therewith a neutralizing substance selected from the group consisting of alkaline earth metal salts and magnesium compounds, incorporating pectase with said material, maintaining the resulting mixture in its solid form at a temperature at which the pectin will be chemically modified by said pectase, terminating the action of the pectase on said pectin, and removing calcium containing material from the resulting solid pectic product.

3. The method of enzymatically treating pectin which comprises providing a pectin-aluminum hydroxide coprecipitate in solid form but moistened with the aqueous medium in which said coprecipitate was precipitated, incorporating with said coprecipitate calcium carbonate in an amount sufficient to maintain the pH of said coprecipitate at at least 5.3 throughout said pectase action, incorporating pectase with said coprecipitate, maintaining the resulting mixture in its solid form at a temperature at which the pectin will be chemically modified by said pectase, terminating the action of the pectase on said pectin, and washing said coprecipitate with acidified aqueous alcohol to remove aluminum hydroxide and calcium containing material from the solid pectic product resulting from said enzyme treatment.

4. The method of treating pectin with pectase which comprises providing a pectin-aluminum hydroxide coprecipitate in solid form but moistened with the aqueous medium in which said coprecipitate was precipitated, the amount of said aqueous medium being reduced to the point where said coprecipitate has a granular form and is capable of absorbing an additional amount of water, providing an amount of a pectase dispersion capable of being absorbed by said coprecipitate and having dispersed therein calcium carbonate in an amount sufficient to maintain said coprecipitate at a pH of at least 5.3 throughout said pectase treatment, incorporating said pectase dispersion with said coprecipitate, maintaining the resulting granular mixture at a temperature at which the pectin will be chemically modified by said pectase, terminating the action of the pectase on said pectin, and removing aluminum hydroxide and calcium containing material from the resulting pectic product, the pectin throughout the entire treatment remaining in solid form.

5. The method of treating pectin with pectase which comprises providing a pectin-aluminum hydroxide coprecipitate, incorporating with said coprecipitate calcium carbonate in an amount sufficient to maintain throughout the pectase action the pH of said coprecipitate at at least 5.3 but not over the pH normally brought about by the calcium carbonate present, incorporating pectase with said coprecipitate, maintaining the resulting mixture at a temperature at which the pectin will be chemically modified by said pectase, and, when the pectase action has progressed to any desired point, incorporating with said coprecipitate alcohol to form a mixture containing about 40% alcohol, draining off free alcohol from the resulting mixture, adding alcohol to the residual solid material to form a mixture containing between 50 and 60% alcohol, incorporating with the resulting mixture alcohol of from 50 to 60% strength and containing acid in an amount sufficient to reduce the pH of the resulting mixture to about 1.0, draining off from the resulting mixture free acidified aqueous alcohol, washing the residual solid material at a pH of about 1.0 with 80% alcohol, thereafter washing the solid material with alcohol until a pH of from 2.3 to 2.5 is reached, thereafter washing the solid material with alcohol containing sodium lactate until a pH of 3.0 is reached, and drying the solid product.

6. The method of enzymatically treating pectin which comprises providing a solid yet moist pectin-aluminum hydroxide coprecipitate, incorporating with said coprecipitate a neutralizing agent selected from the group consisting of alkaline earth metal salts and magnesium compounds in an amount sufficient to maintain said coprecipitate to a pH of at least 5.3 but not substantially over 6.0 when said coprecipitate is subsequently treated with pectase, incorporating pectase with said coprecipitate, maintaining the resulting mixture at a temperature at which the pectin will be chemically modified by said pectase, terminating the action of the pectase on said pectin when said coprecipitate no longer is soluble at a pH of about 2.0, and washing said coprecipitate with acidified aqueous alcohol to remove aluminum hydroxide and calcium compounds from the resulting pectic product, the pectin being in solid form throughout the entire treatment and said resulting pectic product being recovered in solid form.

7. The method of enzymatically treating pectin which comprises providing a moist yet solid pectin-aluminum hydroxide coprecipitate, incorporating with said coprecipitate a neutralizing agent selected from the group consisting of alkaline earth metal salts and magnesium compounds in an amount sufficient to maintain said coprecipitate at a pH of at least 5.3 but not substantially over 6.0 when said coprecipitate is subsequently treated with pectase, incorporating pectase with said coprecipitate, maintaining the resulting mixture in solid form at a temperature at which the pectin will be chemically modified by said pectase, terminating the action of the pectase on said pectin when said coprecipitate no longer is soluble at a pH of 0.60, washing said coprecipitate with acidified aqueous alcohol to remove aluminum hydroxide and calcium compounds from the resulting pectic product and recovering such pectic product.

8. The method of enzymatically treating pectin which comprises providing a water moistened solid coprecipitate of pectin and aluminum hydroxide, incorporating calcium carbonate into said coprecipitate to maintain the same at a pH numerically equal to at least 5.3, incorporating a water dispersion of pectase with said coprecipitate for absorption thereby and admixture therewith while retaining the solid character of said coprecipitate, maintaining the resulting mixture at a temperature at which said pectase chemically modifies said pectin, terminating the action of the pectase on said pectin and removing aluminum hydroxide from the resulting pectic product.

9. The method of enzymatically treating pectin, which comprises admixing with a coprecipitate of pectin and aluminum hydroxide in solid granular form an aqueous dispersion of pectase containing a sufficient quantity of calcium carbonate to maintain the resulting admixture at a pH numerically equal to at least 5.3 but not substantially over 6.0, maintaining said admixture while still in granular form at a suitable temperature below 160° F. at which said pectase will chemically modify said pectin, terminating the action of the pectase on said pectin at the desired point and washing said still solid admixture with acidified alcohol to remove aluminum and calcium compounds therefrom and recover a solid pectic product.

10. A process for preparing low-methoxyl pectinic acids from a dilute aqueous solution of pectin which comprises adding to said solution an acid reacting solution of an aluminum salt to adjust the pH of the solution to about 4.2 to 4.5 to precipitate a water-insoluble pectin-aluminum composition, separating the precipitated pectin-aluminum composition and subjecting it to the action of an enzymic demethoxylating agent to form low-methoxyl pectinic acids and then isolating the low-methoxyl pectinic acids.

11. A process for preparing low-methoxyl pectinic acids from a dilute aqueous solution of pectin which comprises adjusting the pH of the solution to about 3.70 to 4.50 in the presence of a dissolved aluminum salt to precipitate a water-insoluble pectin-aluminum composition, separating the precipitated pectin-aluminum composition, mixing water with said precipitate, subjecting the mixture to the action of an enzymic demethoxylating agent to form low-methoxyl pectinic acids and then isolating the low-methoxyl pectinic acids.

12. A process for preparing low-methoxyl pectinic acids from a dilute aqueous solution of pectin which comprises adjusting the pH of the solution to about 3.70 to 4.50 in the presence of a sufficient quantity of a dissolved aluminum salt to precipitate a water-insoluble pectin-aluminum composition, separating the precipitated pectin-aluminum composition, adding water to said precipitate, subjecting the resulting mixture to enzymic demethoxylation at a pH of at least 5.3 in the presence of pectase, and then isolating the low-methoxyl pectinic acids so formed.

13. A process for preparing low-methoxyl pectinic acids from a dilute aqueous solution of pectin which comprises adjusting the pH of the solution to about 3.70 to 4.50 in the presence of a sufficient quantity of a dissolved aluminum salt to precipitate a water-insoluble pectin-aluminum composition, separating the precipitated pectin-aluminum composition, adding water to said precipitate, subjecting the mixture to demethoxylation in the presence of pectase at a pH of at least 5.3, adding to the low-methoxyl pectinic acids so formed an alcoholic solution of a mineral acid, and then isolating the low-methoxyl pectinic acids.

14. A process of partially demethoxylating pectin to form pectinic acids, which comprises subjecting a moist relatively firm pectin-aluminum hydroxide coprecipitate to the enzymatic action of pectase in an aqueous dispersion, maintaining a pH numerically equal to at least 5.3 during such enzymatic action, and then isolating the resulting pectinic acids.

HERBERT T. LEO.
CLARENCE C. TAYLOR.

REFERENCES CITED

The following references are of record in the file of this patent:

UNITED STATES PATENTS

| Number | Name | Date |
|---|---|---|
| 1,405,055 | McDermott et al. | Jan. 31, 1922 |
| 1,497,884 | Jameson et al. | June 17, 1924 |
| 1,513,615 | Leo | Oct. 28, 1924 |
| 1,908,225 | Currie et al. | May 9, 1933 |
| 2,115,479 | Beach | Apr. 26, 1938 |
| 2,358,430 | Willaman et al. | Sept. 19, 1944 |
| 2,444,266 | Owens et al. | June 29, 1948 |